(12) United States Patent
Kim

(10) Patent No.: US 12,075,467 B2
(45) Date of Patent: Aug. 27, 2024

(54) METHOD AND APPARATUS FOR TRANSMITTING AND RECEIVING PACKETS IN WIRELESS LAN SYSTEM

(71) Applicant: LG ELECTRONICS INC., Seoul (KR)

(72) Inventor: Cheolseung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 519 days.

(21) Appl. No.: 17/593,263

(22) PCT Filed: May 3, 2019

(86) PCT No.: PCT/KR2019/005357
§ 371 (c)(1),
(2) Date: Sep. 14, 2021

(87) PCT Pub. No.: WO2020/226193
PCT Pub. Date: Nov. 12, 2020

(65) Prior Publication Data
US 2022/0159715 A1 May 19, 2022

(30) Foreign Application Priority Data
May 3, 2019 (KR) ........................ 10-2019-0052341

(51) Int. Cl.
*H04W 4/00* (2018.01)
*H04B 7/0452* (2017.01)
(Continued)

(52) U.S. Cl.
CPC .......... *H04W 74/06* (2013.01); *H04B 7/0452* (2013.01); *H04W 74/08* (2013.01); *H04W 84/12* (2013.01); *H04W 88/08* (2013.01)

(58) Field of Classification Search
CPC ..... H04W 74/06; H04W 74/08; H04W 84/12; H04W 88/08; H04W 74/04;
(Continued)

(56) References Cited

U.S. PATENT DOCUMENTS

| 7,359,398 B2 * | 4/2008 | Sugaya ............. H04W 72/0446 455/452.2 |
| 7,881,340 B2 * | 2/2011 | Farrag ................... H04W 74/02 370/468 |
| 8,179,871 B2 * | 5/2012 | Shao .................. H04N 21/4122 370/330 |

(Continued)

FOREIGN PATENT DOCUMENTS

KR 20100059804 6/2010

OTHER PUBLICATIONS

PCT International Application No. PCT/KR2019/005357, International Search Report dated Feb. 3, 2020, 4 pages.

*Primary Examiner* — Amancio Gonzalez
(74) *Attorney, Agent, or Firm* — LEE, HONG, DEGERMAN, KANG & WAIMEY

(57) ABSTRACT

Suggested are a method and an apparatus for transmitting and receiving packets in a wireless LAN system. More specifically, an access point (AP) broadcasts a beacon frame comprising allocation information for a contention free period (CFP) and a contention period (CP) to a plurality of stations (STA). The AP receives an uplink (UL) packet from a first STA among the plurality of STAs. The AP transmits a downlink (DL) packet to a second STA among the plurality of STAs. The length of the CFP is determined on the basis of the number of first STAs and the access category of traffic for the first STA. UL packets are received in as many as the maximum number that can be transmitted within the determined length of the CFP. DL packets are transmitted in as many as the maximum number that can be transmitted during the CP.

20 Claims, 12 Drawing Sheets

(51) Int. Cl.
   *H04W 74/06* (2009.01)
   *H04W 74/08* (2009.01)
   H04W 84/12 (2009.01)
   H04W 88/08 (2009.01)

(58) Field of Classification Search
   CPC ............ H04W 74/006; H04W 72/543; H04W 72/569; H04W 74/0808; H04B 7/0452
   USPC .......................................................... 370/329
   See application file for complete search history.

(56) References Cited

U.S. PATENT DOCUMENTS

| | | | |
|---|---|---|---|
| 8,325,686 B2* | 12/2012 | Shao ..................... | H04W 74/04 370/321 |
| 8,953,633 B2* | 2/2015 | Bhatia .................. | H04W 48/12 370/254 |
| 9,155,027 B1 | 10/2015 | Liu | |
| 9,398,594 B2 | 7/2016 | Benveniste | |
| 10,098,145 B2* | 10/2018 | Yun ..................... | H04W 74/002 |
| 2003/0125087 A1* | 7/2003 | Shimizu ................ | H04W 74/02 455/561 |
| 2006/0029073 A1* | 2/2006 | Cervello ........... | H04W 74/0816 370/389 |
| 2006/0239292 A1* | 10/2006 | Kahana ................ | H04W 74/02 370/465 |
| 2008/0137684 A1* | 6/2008 | Huang ................. | H04W 28/26 370/447 |
| 2010/0158494 A1* | 6/2010 | King ..................... | G03B 17/00 396/56 |
| 2016/0330765 A1 | 11/2016 | Levy et al. | |
| 2017/0311318 A1 | 10/2017 | Li et al. | |

* cited by examiner

METHOD AND APPARATUS FOR TRANSMITTING AND RECEIVING PACKETS IN WIRELESS LAN SYSTEM

CROSS-REFERENCE TO RELATED APPLICATIONS

This application is the National Stage filing under 35 U.S.C. 371 of International Application No. PCT/KR2019/005357, filed on May 3, 2019, which claims the benefit of earlier filing date and right of priority to Korean Application No. 10-2019-0052341, filed on May 3, 2019, the contents of which is hereby incorporated by reference herein in its entirety.

BACKGROUND

Field

The present specification relates to wireless communication, and more particularly, to a method and apparatus for transmitting and receiving a packet in a wireless local area network (WLAN) system.

Related Art

Mobile edge computing (MEC) is a technology which deploys various services and cashing contents at a distance close to a user terminal by applying a distributed cloud computing technology to a wireless base station, thereby reducing congestion in a mobile core network and creating a new local service. A task for standardization is currently underway, led by the European telecommunication standards institutes (ETSI), and at the same time, there are ongoing attempts to apply it to an LTE mobile network in the industry. However, the MEC technology is emerging as a major configuration technology of 5G networks to be introduced in the 2020s along with software defined network (SDN)/network functions virtualization (NFV) technologies. In the present specification, the concept of MEC, various service scenarios, MEC platform structure and technology trends, and the like are reviewed, and roles in 5G and technical problems to be challenged in the future are analyzed.

SUMMARY

The present specification provides a method of transmitting and receiving a packet in a wireless local area network (WLAN) system, and a wireless device using the method.

An example of the present specification proposes a method and apparatus for transmitting and receiving a packet in a WLAN system.

The present embodiment may be performed by an access point (AP). The AP may correspond to a Wi-Fi SoftAP, which is a wireless network device inside a telematics control unit (TCU) for a vehicle in a mobile edge clouding (MEC) network environment.

The AP broadcasts a beacon frame including allocation information for a contention free period (CFP) and a contention period (CP) to a plurality of stations (STAs).

The AP receives an uplink (UL) packet from a first STA among the plurality of STAs.

The AP transmits a downlink (DL) packet to a second STA among the plurality of STAs.

A length of the CFP is determined based on the number of the first STAs and an access category of traffic for the first STA.

The UL packet is received as many as the maximum number that can be transmitted within the determined length of the CFP. The DL packet is transmitted as many as the maximum number that can be transmitted during the CP. That is, packet load balancing in the CFP and the CP may be achieved by adjusting the length of the CFP adaptively according to a QoS characteristic of traffic. Accordingly, a downlink throughput and uplink throughput of the AP may be improved. In particular, in the proposed embodiment, since the UL packet is transmitted during the CFP, the UL packet is prevented from being transmitted during the CP, thereby transmitting more DL packets during the CP. Accordingly, more realtime traffic streaming is possible with the DL packet, thereby improving an overall throughput.

The AP may transmit a contention free (CF) poll frame to the first STA in a unicast manner. The UL packet may be transmitted to each of the first STAs, based on the CF poll frame.

The CF poll frame may be transmitted based on a priority. The priority may be obtained based on the number of packets waiting in a queue and an access category. The access category may include AC_VI(Access Category_Video), AC_VO(Access Category_Voice), AC_BE(Access Category_Best Effort), and AC_BK(Access Category_Background).

The CF poll frame may include an identifier and MAC address of a third STA which supports multi user-multi input multi output (MU-MIMO) among the first STAs. The UL packet may be transmitted from the third STA after the CF poll frame is transmitted and a short interframe sub-space (SIFS) elapses.

The AP may determine a size of a first UL packet that can be transmitted within a transmission cycle of the beacon frame, based on the identifier of the third STA and a data rate of the UL packet.

The AP may determine a time for performing transmission through the MU-MIMO, based on the size of the first UL packet.

The AP may transmit a block Ack (BA) for the UL packet to the third STA.

The CF poll frame may be transmitted whenever transmission is achieved through the MU-MIMO. The BA may be transmitted after a UL packet for a last CF poll frame is received. The BA may include the MAC address of the third STA.

A length of the CFP may be a sum of a length of a first CFP in which the third STA supporting the MU-MIMO transmits a packet and a length of a second CFP in which a fourth STA supporting SU-MMO transmits a packet. The first CFP length may be determined based on the number of the third STAs and an access category of traffic for the third STA. The second CFP length may be determined based on the number of the fourth STAs and an access category of traffic for the fourth STA.

The DL packet may be transmitted based on a backoff value randomly selected in a contention window during the CP. A size of the contention window may be determined based on the number of the second STAs and an access category of traffic for the second STA. A length of the CP may be a length obtained by excluding a transmission cycle of the beacon frame from the determined length of the CFP.

The DL packet may include a packet used in realtime video streaming or voice over Internet protocol (VoIP).

The plurality of STAs may be subjected to an association procedure with the AP. Capabilities of the plurality of STAs may be identified based on the association procedure. The capability may correspond to whether the plurality of STAs support SU-MIMO or MU-MIMO or whether the plurality of STAs support 802.11ac, a, b, g, n, or the like.

The AP may receive high speed data from a base station through a telematics control unit (TCU). The high speed data may be transmitted and received through the UL packet or the DL packet, based on a quality of service (QoS) requirement of the plurality of STAs.

According to an embodiment of the present specification, a TXOPLimit (CFP) is adaptively adjusted based on the number of connections of a Wi-Fi STA and an access category of traffic, and a size of a contention window of EDCA is adaptively adjusted. Therefore, a downlink throughput and uplink throughput of a Wi-Fi SoftAP of Honda 5G PoC can be improved.

DESCRIPTION OF EXEMPLARY EMBODIMENTS

Figure 1:
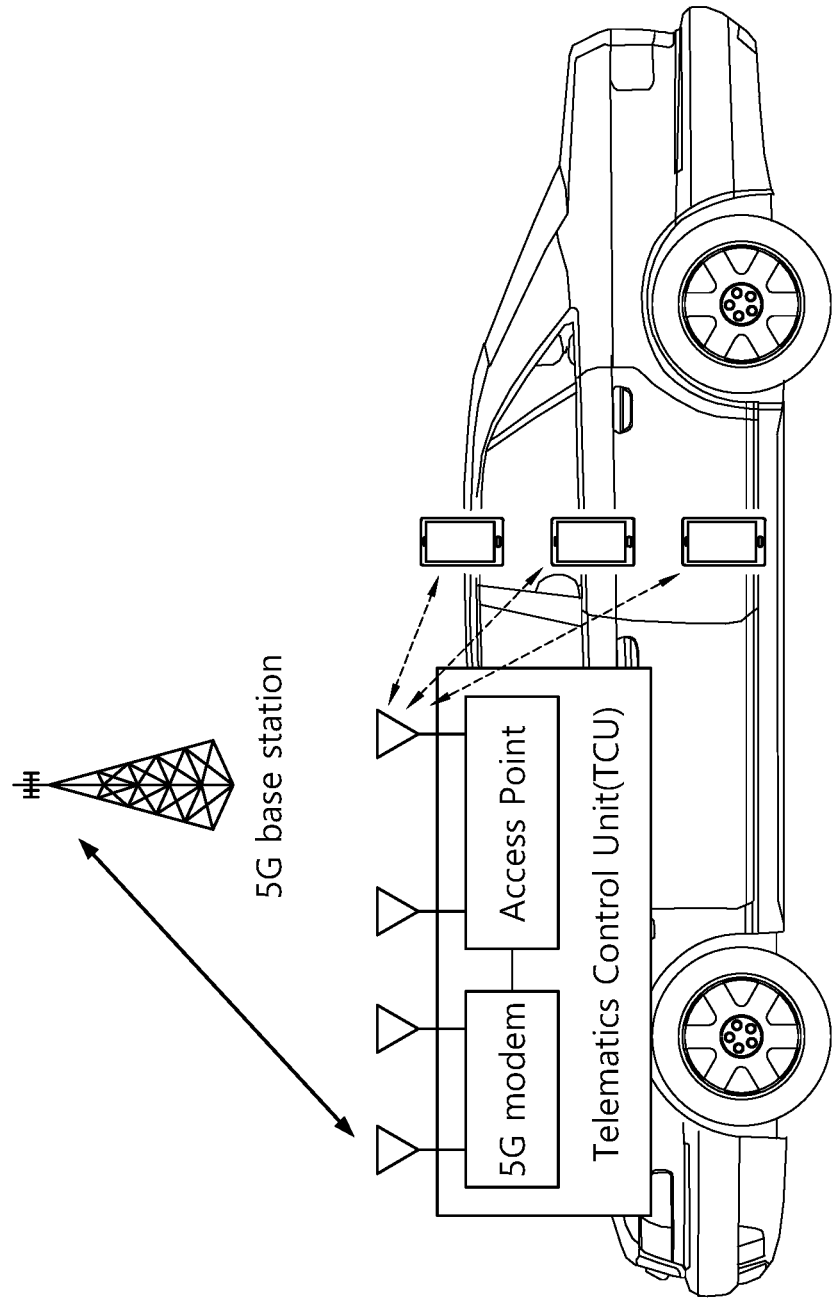
FIG. 1 shows a gateway for a vehicle according to the present embodiment.

FIG. 1 shows a gateway for a vehicle according to the present embodiment.

The present specification describes a technology to be applied to a telematics control unit (TCU) which is under-development as a Honda 5G PoC project. For convenience, a Honda 5G PoC board is referred to as the TCU. The TCU is installed inside a car, and there is a 5G modem and a WiFi chip inside the TCU. The 5G modem inside the TCU receives data of 22 Gbps from a 5G base station and transfers it to the WiFi chip inside the TCU. The WiFi chip inside the TCU operates as a Wi-Fi access point. Passengers in the car have mobile phones which support Wi-Fi, and several passengers access the Wi-Fi access point inside the TCU to use Internet streaming services such as YouTube, Facebook, or the like through their mobile phones. The Wi-Fi access point serves to distribute data downloaded from the 5G base station to the mobile phones accessed to the Wi-Fi access point.

Referring to FIG. 1, although the 5G modem downloads data of 20 Gbps from the 5G base station, data can be downloaded by the Wi-Fi AP inside the TCU at a very low speed, that is, 500 Mbps. In particular, when several mobile phones access the Wi-Fi AP to use Youtube video streaming and the Internet, a speed of the Wi-Fi AP is significantly decreased. If only one mobile phone accesses the Wi-Fi AP, a video download speed may be 500 Mbps. If 5 mobile phones simultaneously access the Wi-Fi AP, instead of a download speed of 100 Mbps for one mobile phone, a streaming speed for one mobile phone may be 50 Mpbs (which is much lower than 100 Mbps).

The present specification relates to a technology which shares data faster when the 20 Gbps data received from the 5G base station is shared to several mobile phones through the Wi-Fi AP.

The TCU is installed in a vehicle to connect devices inside the vehicle with a network while communicating with a base station. The TCU is equipped with a 5G modem and a Wi-Fi AP, so that cars equipped with the TCU can download data of up to 22 Gbps from the 5G base station. Even if the 5G modem transfers the downloaded 20 Gbps data to the Wi-Fi AP, only 500 Mbps transmission is possible due to a limitation of a wireless transmission capability of the Wi-Fi AP. When several mobile phones wirelessly access the Wi-Fi AP, a wireless transmission speed is much lower than 500 Mbps. The present specification provides a technology which provides a high wireless transmission speed even if several mobile phones access the Wi-Fi AP, thereby solving a bottleneck of data transmission.

Specific solutions are as follows.

High Speed Data is Downloaded in 5G Base Station and is Transmitted to Wi-Fi AP

Data downloaded through a 5G modem is stored, and the stored data is transmitted according to respective service requirements of a plurality of wireless terminals. Since the Wi-Fi AP transmits data by considering processing capabilities of low-performance wireless terminals, it is possible to use a real-time data service of the low performance wireless terminals.

Download Service and Upload Service are Simultaneously Supported

A wireless channel is effectively distributed and managed so that a Wi-Fi AP inside a vehicle can simultaneously support a service to be downloaded and a service to be uploaded on a real-time basis.

Station Mode and AP Mode are Both Supported

In a vehicle maintenance center, a telematics control unit downloads a firmware file for upgrade from a 5G base station or a Wi-Fi AP installed inside the maintenance center, so that a real-time video service can be streamed in a plurality of wireless terminals while updating an ECU.

Example of Using Wi-Fi Voice Service

A phone call can be made with KakaoTalk Voice Talk while using a video streaming service with YouTube.

Figure 2:
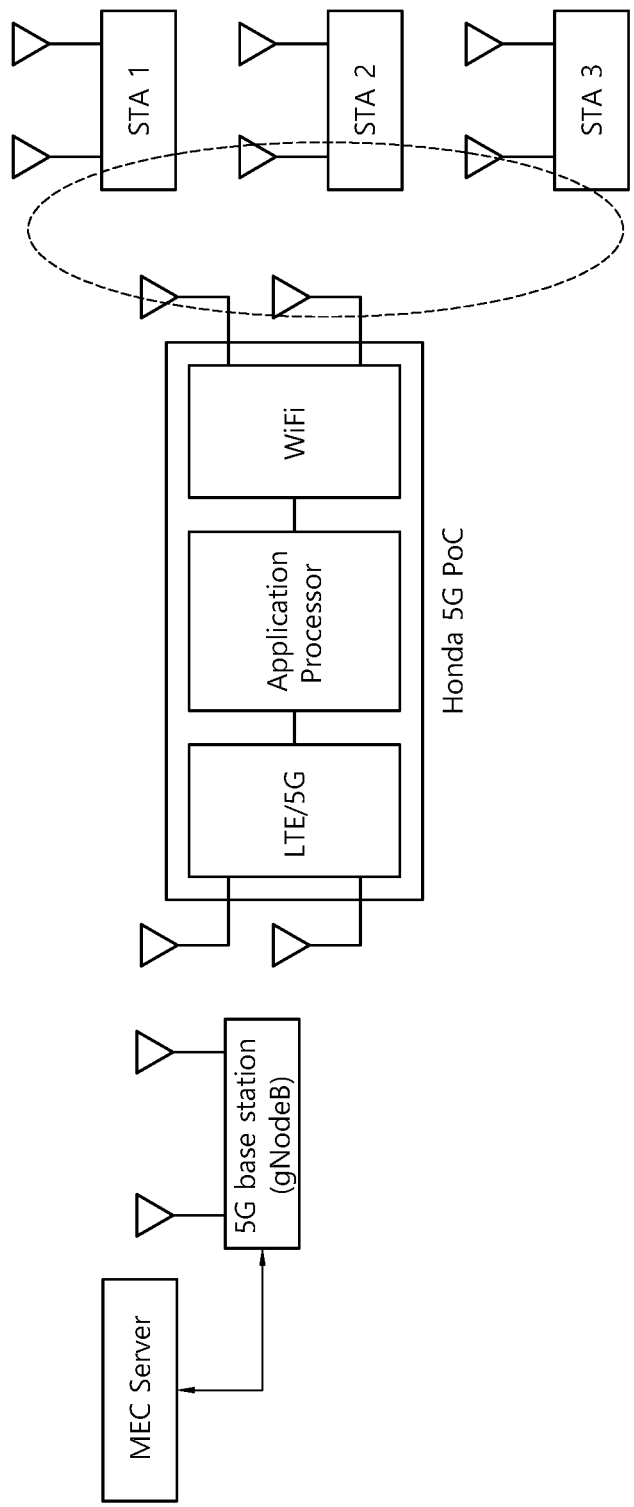
FIG. 2 shows an example of a TCU for a vehicle in an MEC network environment.

FIG. 2 shows an example of a TCU for a vehicle in an MEC network environment.

A 5G modem is applied to enable data communication at 20 Gbps. However, a low throughput of WiFi results in a bottleneck since Honda 5G PoC has a WiFi SoC multi-user throughout (UDP) of 500 Mbps. There is a need to improve a wireless network throughput between a SoftAP and stations.

In order to ensure a ultra-low latency (5 msec) in a mobile edge clouding (MEC) network, a technique and device for load balancing of network traffic are invented while ensuring QoS in such a manner that the traffic is not concentrated on a specific device by effectively allocating and distributing a resource between a wireless network device (Wi-Fi SoftAP) inside a TCU and other interfaces (CAN interface, LTE/5G D2D interface) to a TCU of a vehicle, according to an authentication, security, and QoS policy of an MEC service.

In particular, for QoS in a multi-user situation, a Wi-Fi QoS parameter (TXOP) and EDCA mechanism defined in the 802.11e and Wi-Fi Alliance between a SoftAP(802.11ac, ax, etc.) and MU/SU-MIMO Wi-Fi stations are used to adaptively adjust a TXOPLimit according to a connection number of Wi-Fi stations accessed to the Wi-Fi AP and an access category of traffic and to adaptively adjust Contention Windows size of EDCA, thereby improving a downlink/uplink throughput of a Wi-Fi SoftAP of the Honda 5G PoC.

Figure 3:
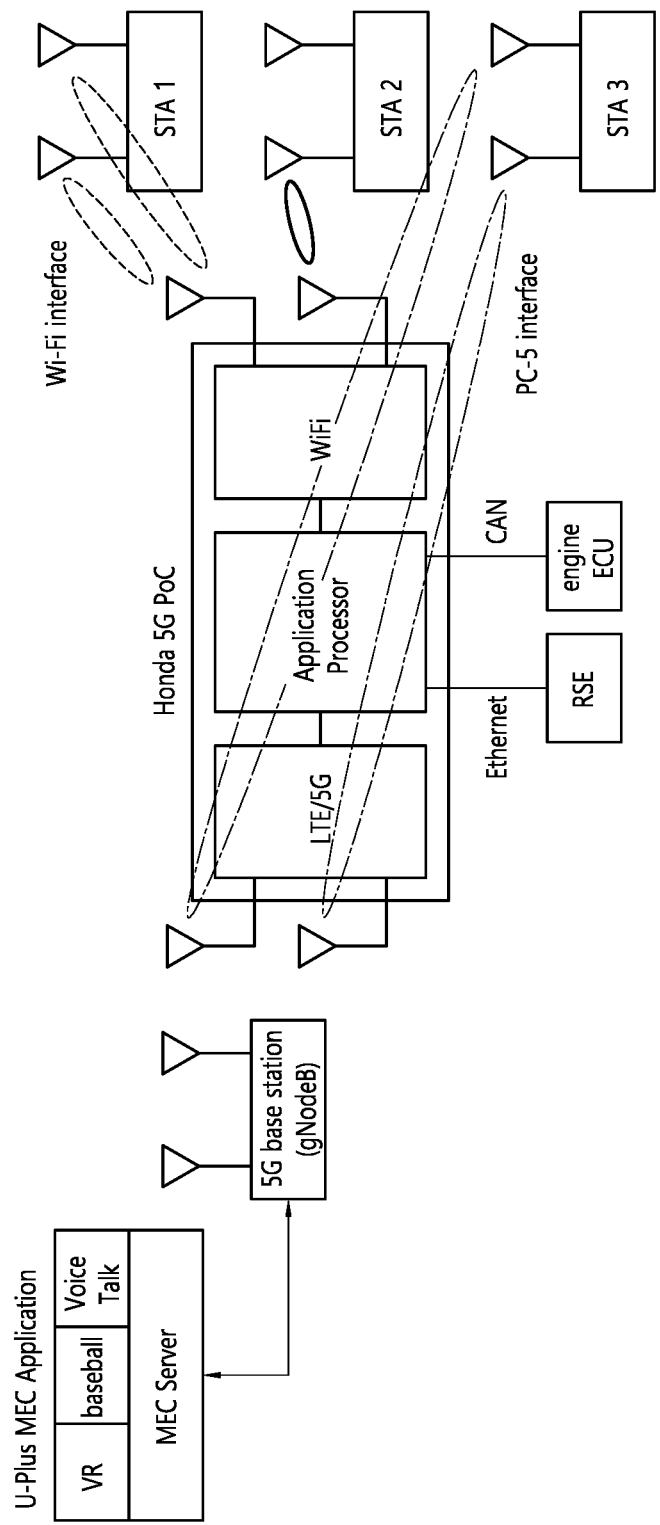
FIG. 3 shows an example in which a TCU uses a PC-5 interface and a Wi-Fi interface in an MEC network environment.

FIG. 3 shows an example in which a TCU uses a PC-5 interface and a Wi-Fi interface in an MEC network environment.

A 5G modem supports reception of 1 Gbps to 20 Gbps. However, STA1, STA2, can support only 500 Mbps through a WiFi Soft AP. Referring to FIG. 3, an MEC server provides a "baseball"+"golf" realtime video streaming service through Wi-Fi interface, and a VR service distributes an interface so that realtime streaming is provided to an STA through an unlicensed band direct interface (PC-5) of the 5G modem.

Hereinafter, a role of an MEC server application will be described.

The MEC server application verifies TCU user's authentication, billing, and unique ID of a TCU and vehicle, and determines a QoS policy and resource distribution policy for devices and Wi-Fi stations connected to the TCU.

In addition, in order to support a video streaming service to a specific station, the MEC server application may distribute two video streaming paths to the MEC server application so that the same data is transmitted using heterogeneous "D2D+WiFi" dual-interfaces.

In consideration of a CPU performance of the TCU and a connected device (capability of tablets and Wi-Fi stations (whether a mobile phone supports D2D+MU-MIMO Wi-Fi)), the MEC server application may transfer a control command for transmitting traffic that can be supported in each device's capability and available resource (wireless frequency, CPU available capability) to MEC Application Client, control the MEC Application Client to ensure QoS of a SoftAP, determine whether the SoftAP allows a Wi-Fi connection of the Wi-Fi station according to a policy of the MEC Application Server, and manage a connection list.

The MEC server application may transfer certain traffic (e.g., engine control CAN interface: engine control ECU frame, D2D interface: "VR video streaming, "golf" video streaming) through an interface connected to the TCU, including the following cases.

MEC Server Application→MEC Server Client→SoftAP→STA1(MU-MIMO)

MEC Server Application→MEC Server Client→D2D Interface→STA3(LTE/5G)

The MEC server application may provide control by downloading a QoS control parameter to the SoftAP so that QoS is ensured at a level according to the following path.

In addition, when STA1 and STA2 use the same wireless channel, the MEC server application may set an adaptive TXOPLimit (CFP duration) so that traffic load balancing is achieved between uplink traffic and downlink traffic. Alternatively, the adaptive TXOPLimit (CFP duration) may be set internally and autonomously by the SoftAP.

MEC Server Application→MEC Server Client→SoftAP→STA1(MU-MIMO): How many frames will be obtained through fragmentation and which seconds of interval will be used to transmit a CF-Poll may be determined by the MEC Server Application or may be determined autonomously by the SoftAP by using an algorithm. Whether TXOP sharing will be applied may also be determined by the MSA or determined autonomously by the SoftAP.

MEC Server Application→MEC Server Client→SoftAP→STA2(SU-MIMO): The same as described above.

In addition, the MEC server application may perform TCU's resource distribution and traffic distribution/QoS management.

To support a service such as video streaming, VR streaming, etc., the WiFi SoftAP may function such that a Wi-Fi interface is determined to stream video streaming (baseball) to the STA1 on a real-time basis, and each of lengths of a CFP duration and CP duration of Wi-Fi is determined to ensure QoS of voice traffic through an uplink so that the STA2 uses KakaoTalk VoiceTalk.

The CFP (TXOPlimit) duration and the CP duration may also be determined directly by the SoftAP.

The role of the MEC Client Application(MCA) in the TCU is as follows.

The MSA downloads a security policy and an authentication policy to the MCA, so that the MCA manages a right to access between devices inside the TCU.

The MEC Client Application operating in the application process can operate in an inter-process call with the SoftAP or inside the SoftAP.

A load balancing operation may be performed autonomously in the MCA or the Soft AP. Alternatively, the load balancing operation may be performed according to a command given by the server application through a path of MSA→MCA→SoftAP.

Figure 4:
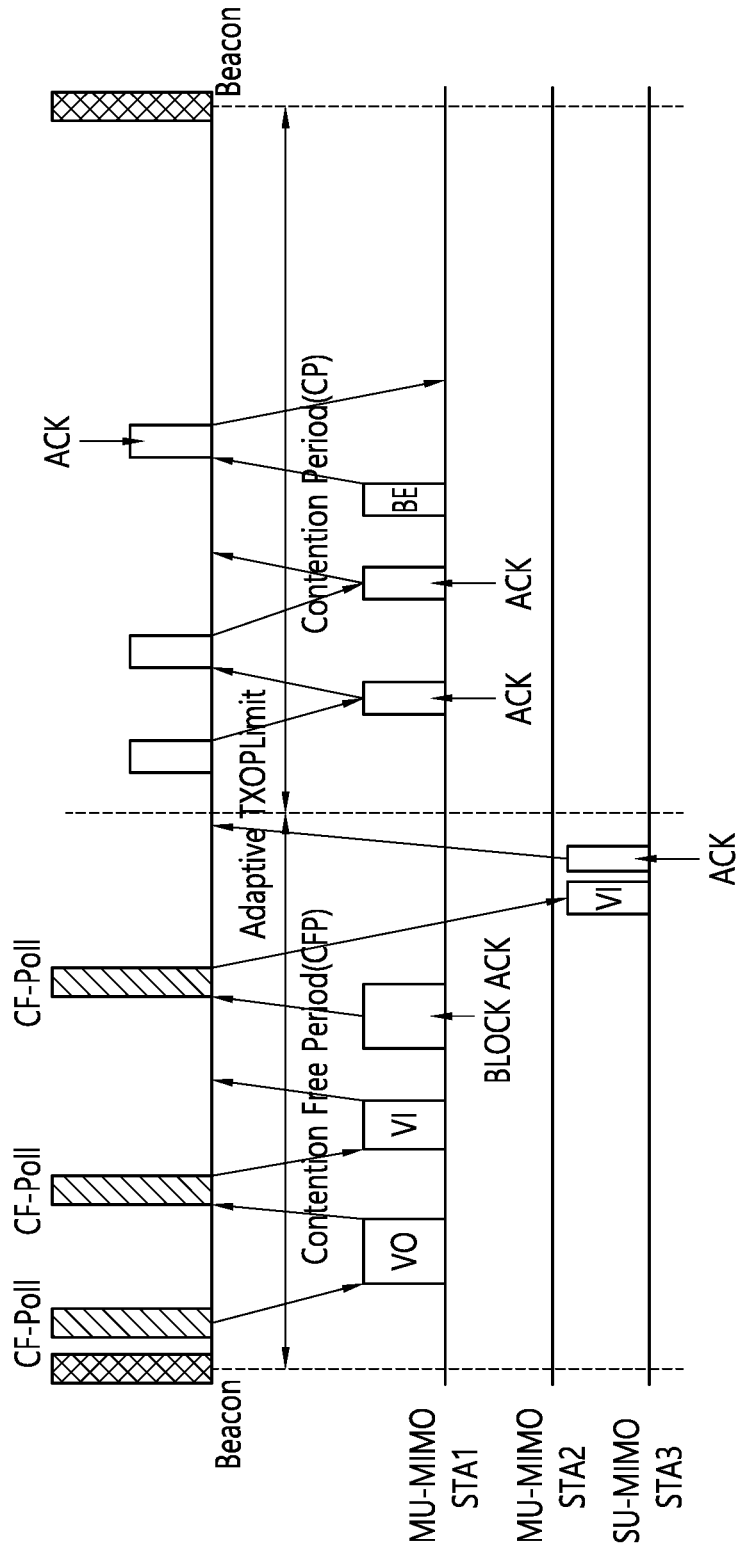
FIG. 4 shows an example of controlling an adaptive channel access duration according to the present embodiment.

FIG. 4 shows an example of controlling an adaptive channel access duration according to the present embodiment.

An adaptive channel access duration (CFP=TXOPlimit) may be controlled by an MEC server application or an MEC client application or a SoftAP, thereby increasing an amount of realtime video streaming through a downlink. An uplink/downlink channel bandwidth can be adaptively load balanced according to a QoS characteristic of traffic sent by the MSA.

Hereinafter, CSMA/CA will be described.

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment. For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision exists. Therefore, a distributed coordination function (DCF) which is a carrier sense multiple access/collision avoidance (CSMA/CA) mechanism is introduced in 802.11. Herein, stations (STAs) having data to be transmitted perform clear channel assessment (CCA) for sensing a medium during a specific duration (e.g., DIFS: DCF inter-frame space) before transmitting the data. In this case, if the medium is idle, the STA can transmit the data by using the medium. On the other hand, if the medium is busy, under the assumption that several STAs have already waited for the use of the medium, the data can be transmitted after waiting by a random backoff period in addition to the DIFS. In this case, the random backoff period can allow the collision to be avoidable because, under the assumption that there are several STAs for transmitting data, each STA has a different backoff interval probabilistically and thus eventually has a different transmission time. When one STA starts transmission, the other STAs cannot use the medium.

The random backoff time and the procedure will be simply described as follows. When a specific medium transitions from busy to idle, several STAs start a preparation for data transmission. In this case, to minimize a collision, the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and thereafter continuously monitors a medium while counting down a backoff slot. In the meantime, if the medium enters a busy state, the countdown is stopped, and when the medium returns to an idle state, the countdown of the remaining backoff slots is resumed.

As described above, carrier sensing is the most fundamental feature of the CSMA/CA. To determine whether a DCF medium is busy/idle, a terminal uses physical carrier sensing and virtual carrier sensing. The physical carrier sensing is achieved in a physical layer (PHY) side, and is achieved through energy detection or preamble detection. For example, if it is determined that a voltage level is measured or a preamble is read in an Rx side, it may be determined that the medium is busy. The virtual carrier sensing is to determine a network allocation vector (NAV) so that other STAs cannot transmit data, and is achieved by using a value of a duration field of a MAC header. Meanwhile, a robust collision detect mechanism is introduced to decrease a collision possibility, and a purpose thereof can be confirmed in the following two examples. For convenience, it is assumed that a carrier sense range is the same as a transmit range.

Hereinafter, a contention period (CP) and a contention-free period (CFP) will be described.

The legacy 802.11e protocol operation method is defined in the standard to ensure quality of service (QoS) of WiFi.

Enhance distributed channel access (EDCA) will be described as follows.

A method used by the legacy Wi-Fi to access a wireless channel is called random backoff. A contention window (CS) is defined in the 802.11 standard. A value between [0, 2CW-1] is randomly selected and then a time slot of a corresponding size is occupied and used by a Wi-Fi AP or a Wi-Fi station.

A specific Wi-Fi station or Wi-Fi AP may exclusively use a corresponding frequency channel for a time called a network allocation vector (NAV), and a Wi-Fi station using the same frequency band enters a sleep state during an NAV duration and scans whether the frequency band is in use at a time at which the NAV ends.

When the specific Wi-Fi station successfully transmits a packet to an AP by using a backoff algorithm, the Wi-Fi AP transmits an ACK packet in which a MAC address of the Wi-Fi statin is written. Only when the Wi-Fi AP receives the ACK packet, it is regarded that a normal packet transmission procedure ends one time.

In order for the Wi-Fi AP to transmit a packet through a download, the same backoff algorithm described above is applied to transmit the packet from the AP to the station, and ACK is received from the station. In this case, it is regarded that one packet is normally downloaded.

If a plurality of terminals attempt an access to the same frequency channel at the same time, a collision occurs, and all of the terminals cannot transmit and receive a packet, and do not attempt a channel access during a specific time. Thereafter, when a specific time elapses, each of the Wi-Fi AP and the Wi-Fi station runs a random backoff algorithm to attempt channel occupation at a specific time slot (the above process is repeated).

However, there is a disadvantage in that the EDCA has a high possibility of collision occurrence. In addition, the collision occurs more frequently with an increase in the number of Wi-Fi stations accessed to the same Wi-Fi AP, and since it is necessary to wait whenever the collision occurs, it is not appropriate for realtime video streaming transmission. In addition, there is a disadvantage in that a packet cannot be transmitted and received within an exact delay requirement.

However, a contention free period (CFP) may be added as a method of compensating for the disadvantage of the EDCA.

That is, when the Wi-Fi station transmits a packet to the Wi-Fi AP, instead of attempting channel occupation at a random time by applying a random backoff algorithm, the Wi-Fi AP operates in such a manner that a packet called a contention free poll (CF-Poll) is transmitted to a specific Wi-Fi station #1 at a time specified for a specific Wi-Fi station, so that only the Wi-Fi station #1 transmits one packet through an uplink in a unicast manner.

When one packet is transmitted to the Wi-Fi AP after the specific Wi-Fi station #1 receives the CF-Poll, the Wi-Fi AP transmits ACK by designating a recipient address to a MAC address of the Wi-Fi station #1. The ACK transmission is also unicast transmission in which the Wi-Fi station #1 receives only ACK.

The Wi-Fi AP transmits ACK to the station #1, and then performs transmission to a different second station #2 by writing a recipient address of a CF-Poll as a MAC address of a Wi-Fi station #2. The station #2 transmits one packet to the Wi-Fi AP, and the Wi-Fi AP which has received the packet transmits ACK to the station #2.

However, the following disadvantage occurs when the CFP is used.

A duration of operating in a contention free period manner is called TXOPLimit, and cannot be changed if it is set one time when a Wi-Fi modem is booted. In particular, even if stations have no packet to be sent through an uplink, the Wi-Fi AP sends a CF-Poll to each of all stations accessed thereto during a CFP duration, which may result in a waste of time.

Figure 5:
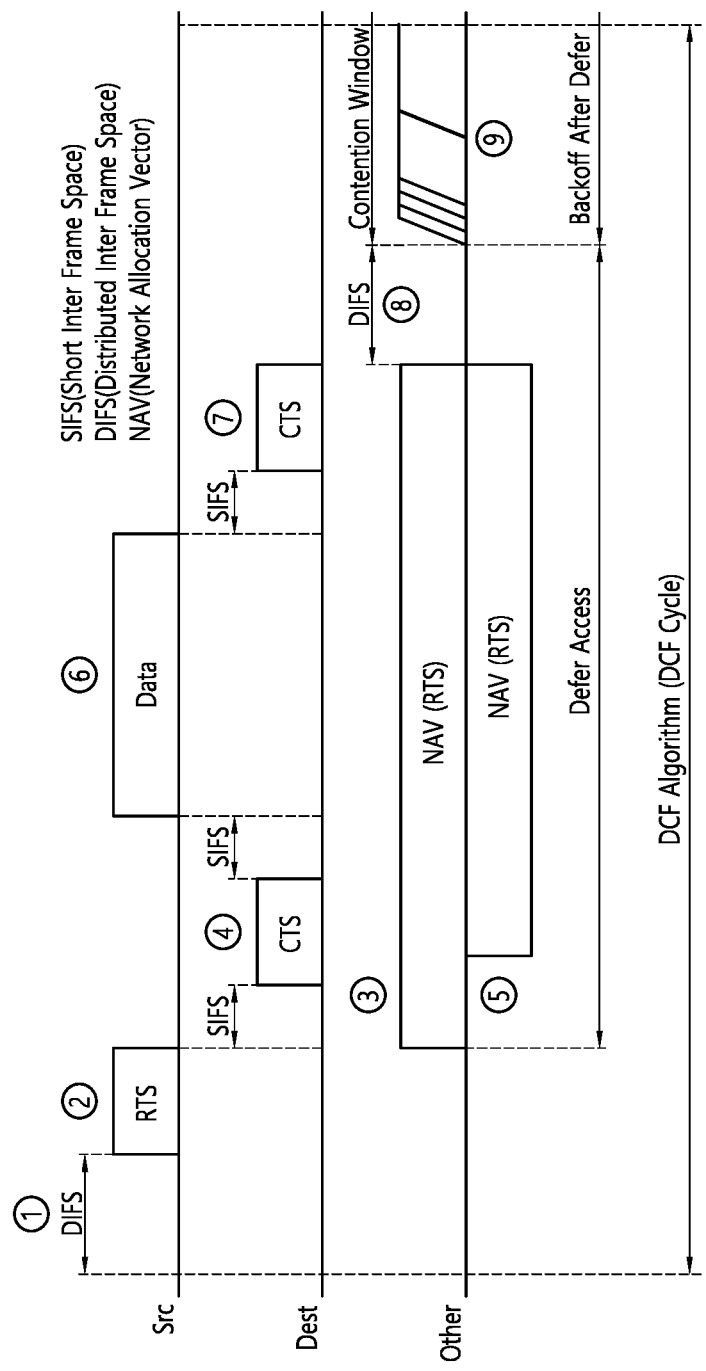
FIG. 5 shows an example of a DCF cycle.

FIG. 5 shows an example of a DCF cycle.

A distributed coordination function (DCF) is one of the most basic functions of a WLAN MAC protocol. A main role of this function is to reserve data transmission, based on CSMA/CA, backoff, and various inter frame spaces (IFSs). An overall DCF cycle (algorithm) is the same as shown in FIG. 5 (Of course, it looks more complicated than CSMA/CA+backoff).

A specific operation of FIG. 5 is as follows.

Step 1: A device (Src) performs carrier sensing and verifies whether a channel is available (idle). If the channel is empty for a specific duration (DIFS: a DCF inner frame space), the operation proceeds to step 2.

Step 2: The Src (initiator) device sends RTS to a Dest (recipient) device.

Step 3: All other devices (devices other than the Src and the Dest) do not attempt to obtain a channel until communication between the Src and the Dest is complete since an NAV is updated based on duration information of RTS.

Step 4: The Dest device sends CTS to the Src device.

Step 5: All other devices update the NAV, based on duration information of CTS.

Step 6: After a temporary interruption (SIFS: short interframe space), the Src device sends data to the Dest device.

Step 7: When an SIFS elapses after receiving the data, the Dest device sends ACK to the Src device.

Step 8: After completing one data transmission cycle, all devices (including the Src and the Dest) shall have another short interruption (DIFS).

Step 9: Then, all devices temporarily stop during a specific backoff time (this backoff period is randomly determined for each device).

Figure 6:
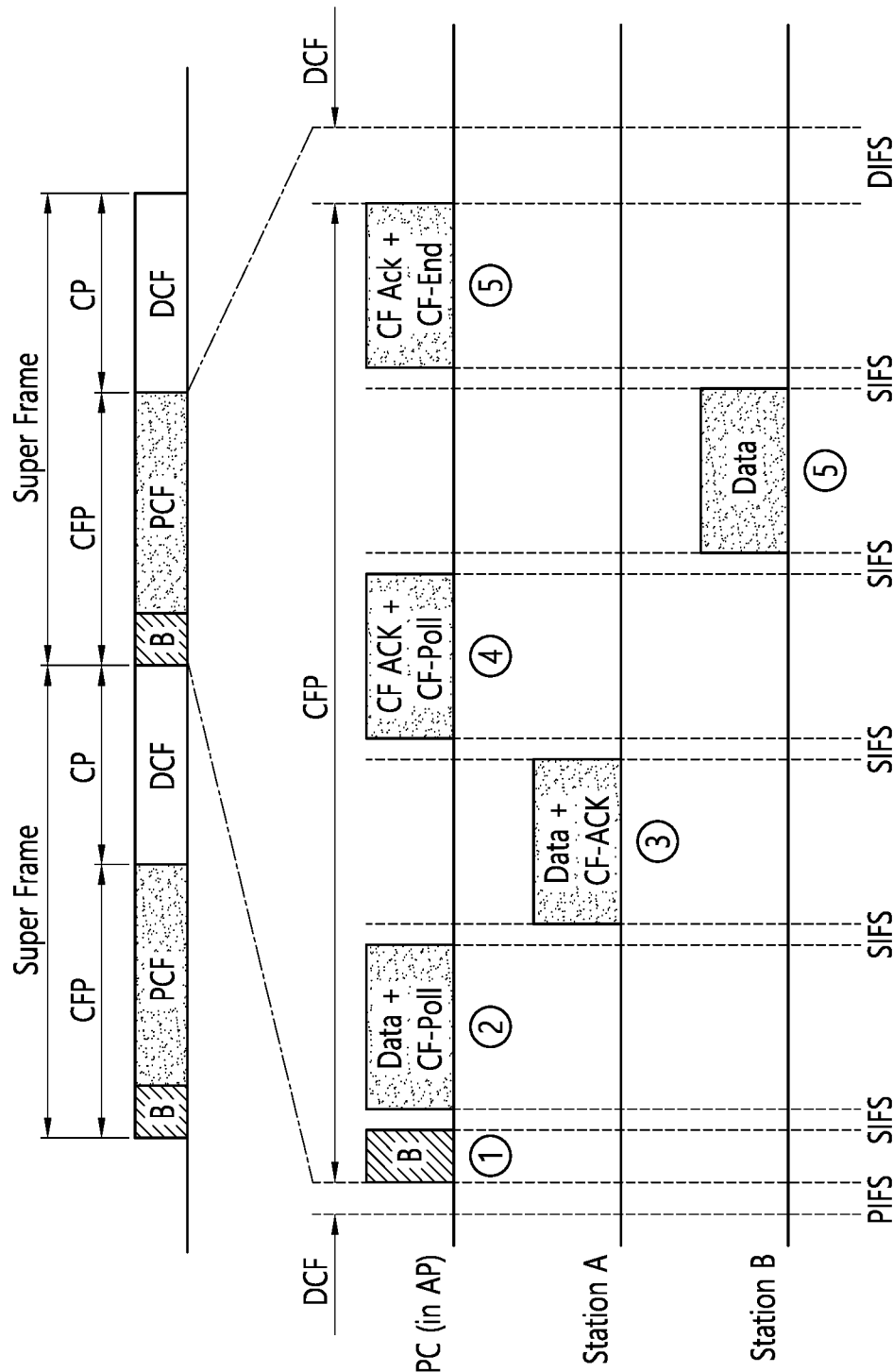
FIG. 6 shows an example of a CFP and a CP.

FIG. 6 shows an example of a CFP and a CP.

At present, WLAN communication generally has no specific center controller for data scheduling (i.e., data transmission and reception). Most of scheduling is based on a distributed coordination function (DCF). A new algorithm called a point coordination function (PCF) operating (at least in part) as a centralized controller is introduced as another method of algorithm scheduling. However, the PCF is not an essential algorithm in the 802.11 specification. It is optional even if it is regarded that the specification itself was finished several years ago. The DCF is basically a contention-based algorithm, and the PCF is similar to a contention-free algorithm.

An overall scheduling algorithm of the PCF is as follows. As shown in the figure, not all data communication is performed in a contention-free (CF) manner even in the PCF. It occurs in a duration of switching the CFP and the CP. The present embodiment will focus on what happens in the CFP. FIG. 5 may be referred to know what happens in the CP.

In a PCF operation, a point coordinator (PC) in an access point controls a wireless channel, and controls data scheduling (transmission and reception) of all stations (WLAN user devices). In fact, in the PCF, the access point intercepts the wireless channel with a transmission signal during an inter frame space (IFS) in which transmission is not allowed.

An example of a PCF operation is as follows (In fact, a method in which the PC controls each station may have several variations, but a basic logic is similar to the diagram shown herein).

In FIG. 6, B denotes a beacon, PIFS denotes a point inter frame space, DIFS denotes a distributed inter frame space, and SIFS denotes a short inter frame space.

A specific operation of FIG. 6 is as follows.

Step 1: An AP sends a beacon immediately after the PIFS (the PIFS is shorter than the DIFS). This means that the beacon is transmitted within an IFS of the conventional scheduling method. Since this beacon is transmitted through a medium (radio channel) while no transmission occurs, this message arrives at all stations (WLAN devices) without a collision risk. This beacon transfers information on a PCF function of the AP. In this step, the AP controls a wireless channel.

Step 2: If the AP has data for a station A, the AP sends [data] and [CF-Poll] to the station A.

Step 3: Since the station A obtains the CF-Poll (grant) from the AP, it may transmit [data and ACK] to the AP (if there is data for the AP).

Step 4: Now, the AP sends [Ack] to the station A and sends [CF-Poll] to the station B (when the AP assumes that there is no data for a station B).

Step 5: Upon receiving the CF-Poll (grant) from the AP, the station B may transmit [data] to the AP (if there is data for the AP).

Step 6: After giving the CF-Poll (grant) to all devices, in order to notify all devices (stations) in which this is an end of the CFP, the AP transmits [Ack] to a last station (in this case, the station B) and transmits [CF-End].

The maximum number (Nmax) of simultaneously accessible multi-users provided by a WiFi chip vendor is predetermined. In fact, in both in-door and out-door environments, due to interference and noise, there are many cases where only a connection is possible and a data service cannot be supported. In case of Cypress, it is guided by a chip vendor that 8 2×2 SU-MIMO connections are possible, and at least 100 Mbps can be supported for each connection. It is verified that up to 7 connections are made, but when a UDP traffic continuous transmission/reception (streaming) test is achieved in practice, 50 Mbps can be supported for up to 6 connections. This is problematic in a sense that it is significantly lower than that guided in the chip vendor.

The legacy 802.11e, Wi-Fi Alliance Hotspot2.0 technique has a limitation.

The 802.11e/WFA standard provides only a QoS parameter and does not provide a specified QoS control algorithm.

At present, in a hostapd which is widely used as an open source, according to values defined in the Hotspot2.0 standard, a contention free period/contention period and a minimum window size and maximum window size of an access category for each traffic are determined statically only one time when a system is booted.

The setting is achieved only one time at initial booting, and no change is made thereafter. Therefore, traffic with multi-connections and various access categories for respective connections cannot be effectively processed.

Even if a queue is empty, a Wi-Fi firmware of a SoftAP repeats an unnecessary operation of scanning the queue.

Thus, firmware software inside a Wi-Fi SoC chip actually does not have an opportunity to frequently scan AC_VO_Queue in which a voice packet having a small delay requirement is buffered and AC_VI_Queue in which a video packet is buffered.

An overflow may occur in AC_VO_QUEUE and AC_VI_QUEUE inside the Wi-Fi SoC firmware. As a result, voice may be discontinuous or streaming video may be broken.

The present specification proposes a technique of improving a throughput of a CFP duration according to MSA's QoS policy or autonomously by MCA or SoftAP. In particular, a TXOP limit size is adaptively controlled to maximize a throughput for transmission of Wi-Fi Station→Wi-Fi SoftAP, by considering both the number of connections of the accessed Wi-Fi stations and an access category (QoS) of each traffic for each connection.

In addition, the present specification proposes a technique of improving a throughput of a contention period according to MSA's QoS policy or autonomously by MCA or SoftAP. When a contention window size defined for each access category is specified, according to the number of Wi-Fi stations simultaneously accessed to the Honda 5G SoftAP and an access category of a packet transmitted and received through the connection, transmission is performed based on an amount of a buffered packet to be transmitted from the SoftAP to the station and a QoS scheduling algorithm described below.

The SoftAP can operate simultaneously as the Wi-Fi station and the SoftAP, and can access an external Wi-Fi AP to download data and transmit data to a plurality of terminals accessed to the SoftAP by considering QoS.

In the present embodiment, according to a characteristic of a MAC protocol, channels of the same frequency are simultaneously used in an uplink(station→SoftAP) and a downlink(SoftAP→station). Therefore, in a multi-user situation, there is a high possibility that many stations and Wi-Fi APs perform EDCA random access in a CP duration, causing a delay.

In the proposed disclosure, an uplink packet is uploaded in a CFP duration to avoid a possibility of uploading a packet through an uplink in a CP duration. Therefore, there is an opportunity to stream realtime traffic through a downlink more frequently using EDCA during the CP duration, thereby improving a throughput.

Cyclic verification information of a multi-user connection algorithm is as follows.

1. Execute Wpa_cli status to verify connection information(IP number, etc.) of accessed stations.
2. Send ping from SoftAP→each Wi-Fi station and measure Delay(msec)
3. Determine an SINR value such that the smaller the delay after transmission, the better the SINR value, and give a high priority when transmission is performed from the SoftAP to the station.

EXAMPLE

Delay1: 1 sec→priority=1
Delay2: 2sec→priority=2
Delay3: 3sec→priority=3

A group of each of stations is configured by distinguishing stations for performing transmission and reception in a contention free period (CFP) and stations for performing transmission and reception in a contention period (CP).

In an initial operation, the SoftAP transmits a CFP-Poll to all stations in a unicast manner, and transmits a packet through an uplink for each station during a CFP duration.

The SoftAP verifies a packet received from each station. Stations having only a header and not having a payload part are classified as G-CP which is a set of stations using a CP duration, and stations having data for sending a packet through an uplink are classified as Group_CFP=G_CFP.

The stations of the G-CFP aggregate stations supporting MU-MIMO to configure a group G_CFP_MU.

Among the stations belonging to the G-CFP, stations supporting SU-MIMO are aggregated to configure a group G_CFP_SU.

An address list of the G_CFP_MU is written in a recipient address of TXOP, and the SoftAP transmits the CF-Poll to stations according to a weighted priority.

Figure 7:
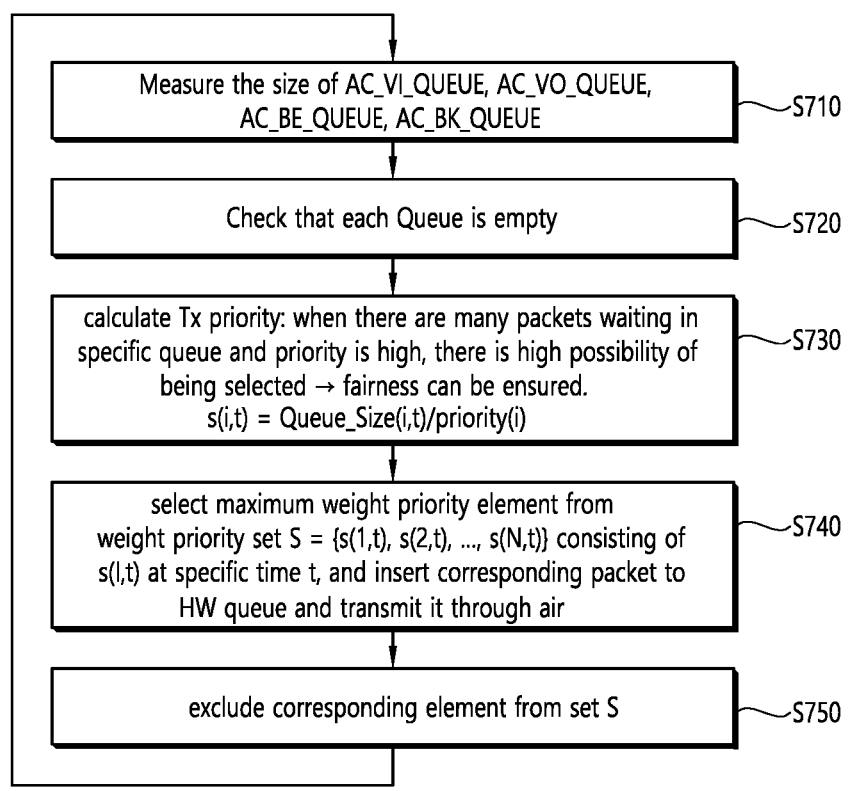
FIG. 7 shows a QoS scheduling algorithm according to the present embodiment.

FIG. 7 shows a QoS scheduling algorithm according to the present embodiment.

According to FIG. 7, a traffic access category may be classified, and a contention window minimum/maximum size for each access category may be determined.

In step S710, a transmitting device measures a size of AC_VI_QUEUE, AC_VO_QUEUE, AC_BE_QUEUE, AC_BK_QUEUE. (AC(Access Category): AC_VI(Video), AC_VO(Voice), AC_BK(Background), AC_BE(Best Effort))

In step S720, the transmitting device checks whether each queue is empty.

In step S730, the transmitting device calculates a Tx priority. When there are many packets waiting in a specific queue and a priority is high, there is a high possibility of being selected, and a fairness can be ensured. $s(i,t)=$Queue_Size$(i,t)/$priority$(i)$ In step S740, a maximum weight priority element is selected from a weight priority set S={s(1,t), s(2,t), s(N,t)} consisting of s(I,t) at a specific time t. A corresponding packet is inserted to a HW queue and then is transmitted through the air.

In step S750, a corresponding element is excluded from the set S above.

Hereinafter, a multi-user QoS aware TXOP allocation scheme is described to support simultaneous transmission of a plurality of MU-MIMO stations.

In order for multi-users (stations) supporting MU-MIMO to transmit a packet through an uplink (MU-MIMO station→SoftAP), a SoftAP broadcasts a CF-Poll. In this case, which stations will perform transmission simultaneously through the uplink is written in the CF-Poll.

When a station supports MU-MIMO, a plurality of station IDs or a plurality of station MAC addresses are specified in a specific bit of the CF-Poll and then the CF-Poll is broadcast, so that a QoS packet can be transmitted simultaneously through the uplink.

All stations check the specific bit of the broadcast packet to verify that a TXOP thereof is allocated.

The packet is transmitted through the uplink after waiting for a short interframe sub-space (SIFS).

The CF-Poll is broadcast, so that the stations simultaneously transmit the packet at an uplink transmission cycle thereof, thereby improving an uplink throughput.

A multi-user QoS scheduling algorithm regarding a specific order of transmitting a packet of a specific access category of a specific station in each of a contention free period and a contention period will be described below.

The multi-user QoS scheduling algorithm is described as follows.

Wi-Fi stations of 802.11ac may be stations supporting only SU-MIMO or stations supporting MU-MIMO.

The station may support only 802.11n or 802.11a,b,g,n, ad,

In case of the legacy 802.11 protocol (802.11a,b,g,n), a MU-MIMO function is not supported.

Therefore, in order for the SoftAP to perform multicast to the stations supporting MU-MIMO, a CF-Poll is multicast by writing several recipient IDs (stations ID or station MAC addresses) in the CF-Poll.

Among the stations, only the stations supporting MU-MIMO normally decode a MU-TXOP message, and transmit a packet through an uplink.

S: group of all stations
Si: i-th station
S={s1, s2, sn}

A station s(i) of which a user selection priority calculated as follows is the greatest is selected for all elements of the group S, and an opportunity to upload a packet through an uplink is given first. That is, a MAC address of a corresponding station is written as a recipient address of a CF-Poll.

```
Max{
for(i=0; i< N_G_CFP_MU; i++)
{
for(j=0; j <NG_CFP_SU;j++)
{
sum(G_CFP_MU(i,t)) +sum(G_CFP_SU(j,t))
}
}
```

The SoftAP analyzes an association packet received from the plurality of stations, and recognizes a capability (whether to support MU-MIMO, SU-MIMO, 802.11ac, a,b, g,n, or the like) of each of the stations.

An amount (AC_xxx_QUEUE_size) of a packet buffered in AC_VO_QUEUE, AC_VI_QUEUE, AC_BE_QUEUE, AC_BK_QUEUE of the SoftAP is recognized for each access category for each user (station) transferred from LTE/5G modem→PCI interface→Application Process (SoftAP).

A contention free period (CFP) is recognized through a CFP calculation method described below, and thereafter is calculated as "Contention Period(CP)=Beacon Transmission Interval(100 msec)−CFP".

How many frames shall be sent to each station within this beacon cycle (100 msec) is calculated by adding an ID of MU-MIMO stations capable of performing transmission and reception through an uplink and an uplink data rate of each station. If a size thereof is longer than one maximum MPDU size (UDP: 1470 bytes), how many frames will be obtained through fragmentation is determined, and the fragmented frame is copied to an MSDU. Thereafter, how many MSDUs will be aggregated to generate one MPDU is determined.

In this case, how many MPDUs will be aggregated again to generate an A-MPDU is determined, and a total header+ "A-MPDU size" is determined. A time T_AMPDU(i) required when transmission is performed through 2×2 SU-MIMO is calculated with a current MCS-level.

The SoftAP verifies whether a frame burst function is applicable to a WiFi driver, and transmits a CF-Poll for each duration of T_AMPDU(i) if the frame burst function is supported. If the frame burst function is not supported, the CF-Poll is transmitted every time of (T_AMPDU+SIFS), and a packet is received from a corresponding station. Thereafter, a last A-MPDU is transmitted, and then Block-ACK is transmitted from the SoftAP-to the station. In this case, a MAC address of a plurality of stations is written in a recipient of the BlockACK.

An amount of a packet to be transmitted through an uplink of each of stations supporting SU-MIMO is calculated to calculate a duration of "AMPDU+SIFS+ACK" in the same manner described above. Thereafter, when a corresponding cycle arrives, a CF-Poll is transmitted from the station to the SoftAP. Upon completion of packet reception, ACK is transmitted from the SoftAP to the station.

TXOPlimit is updated so that both MU-MIMO stations and SU-MIMO stations can transmit a packet through an uplink. In a case where all uplink packets cannot be transmitted within TXOPLimit max, for a fragmented frame which is not uploaded, the SoftAP may send a PS-Poll to a corresponding station during a CP duration to give an opportunity to upload it. Of course, during the CP duration, the station may upload the fragmented frame by randomly accessing to a channel in an EDCA backoff manner. If all of N AMPDUs are not transmitted within a duration of TXOPLimit due to a small size of TXOPLimit, BlockACK may be sent upon receiving all of the N AMPDUs within the TXOPlimit.

Figure 8:
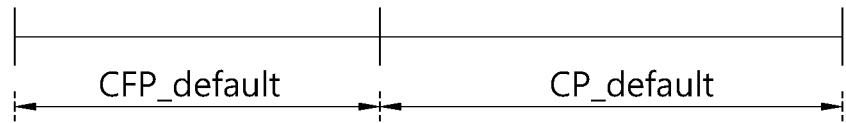
FIG. 8 is an example showing a duration in which a CFP default value and a CP default value are set.

FIG. 8 is an example showing a duration in which a CFP default value and a CP default value are set.

An algorithm for adaptively changing a contention period for a downlink transmission packet in an EDCA manner during the contention period is as follows.

In step 1, a SoftAP sets CFP default and CP default values.

In step 2, for each of AC_VO, AC_VI, AC_BE, AC_BK, a contention window size(AC_xx_CWmin, AC_xx_CWmax) is classified by an access category.

The number of connected STAs verified in the SoftAP is defined as follows.

N_CFP_UL_MU="the number of MU-MIMO STAs transmitting a packet through an uplink during a CFP duration"

N_CFP_UL_SU="the number of SU-MIMO STAs transmitting a packet through an uplink during a CFP duration"

N_CFP_DL_MU="the number of MU-MIMO STAs transmitting a packet through a downlink during a CFP duration"

N_CFP_DL_SU="the number of SU-MIMO STAs transmitting a packet through a downlink during a CFP duration"

N_CP_UL_MU="the number of MU-MIMO STAs transmitting a packet through an uplink during a CP duration"

N_CP_UL_SU="the number of SU-MIMO STAs transmitting a packet through an uplink during a CP duration"

The SoftAP identifies MU-MIMO stations and SU-MIMO stations transmitting a packet through an uplink during a first duration of CFP+CP. In addition, the SoftAP schedules MU-MIMO stations and SU-MIMO stations transmitting a packet through an uplink during a CP duration so that a packet is transmitted through an uplink during the CP duration.

In case of MU-MIMO stations, a destination address of a CF-Poll is filled with an address or ID of MU-MIMO stations so that a packet is transmitted simultaneously through an uplink. The SoftAP sends ACK to the MU-MIMO stations at once by aggregating IDs of corresponding stations through BlockACK. The SoftAP calculates a time required when SU-MIMO stations transmit a packet through an uplink after transmitting the BlockACK and then waiting for SIFS.

A contention free period is calculated by the following equation.

```
TIME_Rx_CFP_SU = N_CFP_UL_SU X {
(T_AC_VI_MAX + SIFS + ACK +SIFS)
+ (T_AC_VO_MAX + SIFS + ACK +SIFS)
+ (T_AC_BE_MAX + SIFS + ACK +SIFS)
+ (T_AC_BK_MAX + SIFS + ACK +SIFS)
}
TXOPLimit = Total_TIME_Rx_CFP = TIME_RX_CFP_MU + TIME_RX_CFP_SU
```

Figure 9:
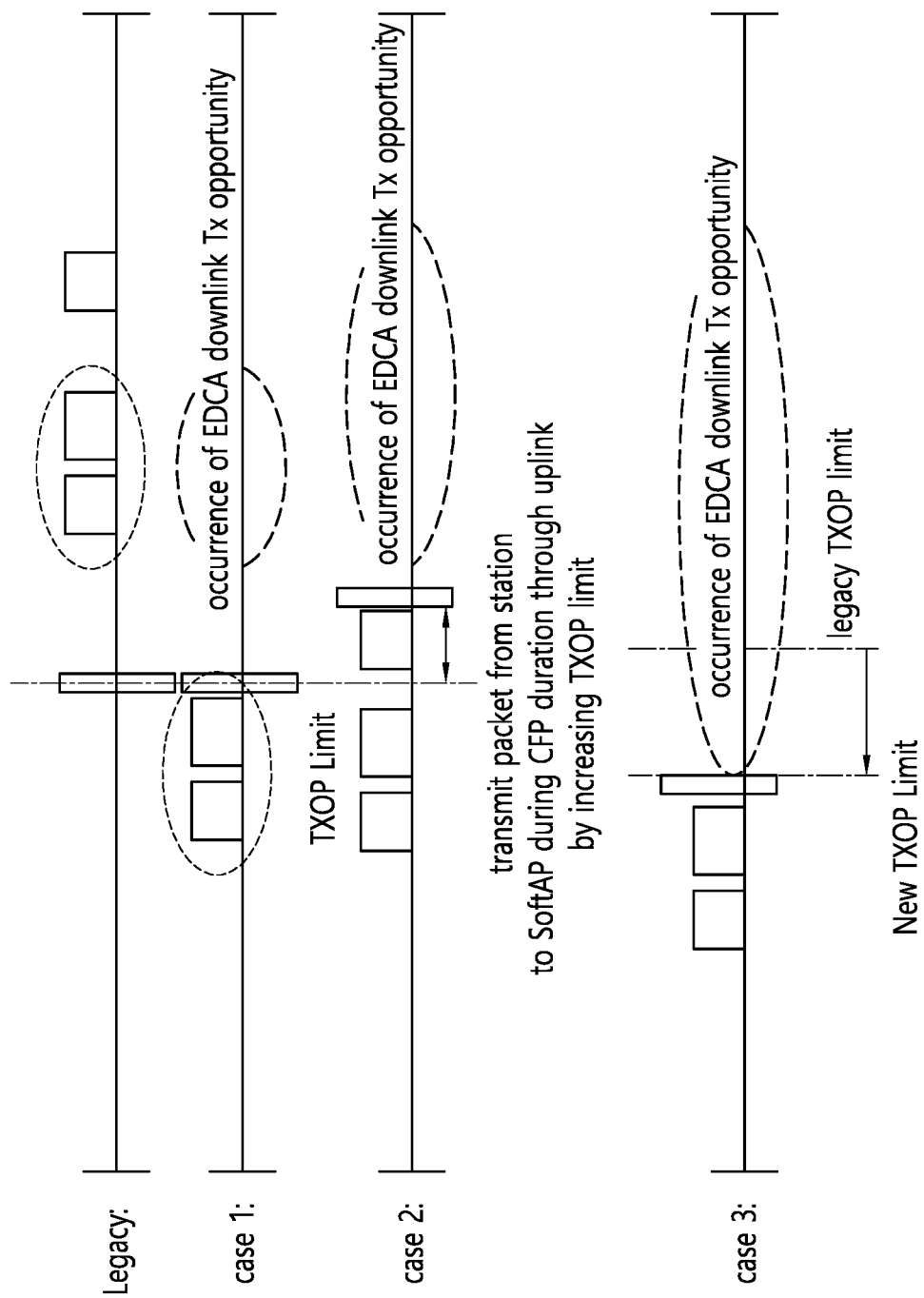
FIG. 9 shows an example of adjusting a duration set to a CP and a duration set to a CFP to increase a downlink transmission opportunity.

FIG. 9 shows an example of adjusting a duration set to a CP and a duration set to a CFP to increase a downlink transmission opportunity.

Referring to FIG. 9, uplink packet transmission is adjusted such that transmission is performed from a station to a SoftAP in a duration of CFP, and thus there is more opportunities to transmit a packet from the SoftAP to the station through a downlink in an EDCA manner. Accordingly, a downlink throughput is increased, and it is preferable for video/voice streaming.

The legacy case of FIG. 9 shows a network environment in which there are not many EDCA downlink transmission opportunities due to uplink packet transmission in a CP duration.

A case 1 of FIG. 9 shows a network environment in which uplink packet transmission is scheduled in a CFP duration to increase an EDCA downlink transmission opportunity, compared to the legacy case.

A case 2 of FIG. 9 shows a network environment in which the EDCA downlink transmission opportunity is increased by more increasing the CFP duration for scheduling uplink packet transmission than the case 1.

A case 3 of FIG. 9 shows a network environment in which the EDCA downlink transmission opportunity is increased by more decreasing the CFP duration for scheduling uplink packet transmission than the case 1.

In the EDCA mechanism, a backoff algorithm based on an adaptive contention window is as follows.

N_total: total Wi-Fi station number
N_AC_VO: the number of stations using Voice
N_AC_VI: the number of stations using Video
N_AC_BE: the number of stations using BE
N_AC_BK: the number of stations using BK
CW_AC_VO=(CWmin_AC_VO_default)×(N_AC_VO (t))−1
CW_AC_VI=(CWmin_AC_VI_default)×(N_AC_VI (t))−1
CW_AC_BE=(CWmin_AC_BE_default)×(N_AC_BE (t))−1
CW_AC_BK=(CWmin_AC_BK_default)×(N_AC_BK (t))−1

Tx/Rx Timing Determine $CW_i(t)$=Random[0, CW_AC$_i$(t)]
$T=2^{CWi(t)}-1$

The aforementioned operation may be described as follows.

A WiFi AP may adaptively change TXOPLimit by adjusting a length of TXOPLimit according to the number of stations connected to the Wi-Fi AP and a type of a packet (service) to be uploaded by each station.

The WiFi AP does not give a transmission opportunity (TXOP) to stations which have no packet to be sent through an uplink during the CFP duration, thereby saving a wireless channel occupying time during the CFP duration. In particular, in order to save a time of using a channel while the Wi-Fi AP frequently sends ACK, even if a packet is sent through an uplink to stations equipped with a MU-MIMO function by each station, instead of sending ACK to each station, BlockACK is sent in an aggregated manner by writing a MAC address of corresponding stations to a recipient address, thereby saving a time wasted to send each ACK. In addition, when the recipient address is written in the CF-Poll, several MU-MIMO stations may be written at a time, so that the MU-MIMO stations can know information on a time for simultaneously transmitting a packet through an uplink.

The EDCA backoff algorithm defined in the standard results in performance deterioration since a collision occurs frequently when a plurality of Wi-Fi stations access.

A packet may be sent through an uplink in an EDCA manner during a contention period duration, or the packet may be sent through a downlink. According to the aforementioned embodiment, since the packet is sent to the maximum extent possible through the uplink during a CFP duration, many packets such as VOIP or realtime video streaming may be sent during a CP duration.

A value of CW may be defined as $$"2^{N \times CW_i \times \frac{r_j(t)}{\overline{r_j(t)}}} - 1"$$

in consideration of a situation where a backoff algorithm is used in the presence of N stations.

A parameter used in the equation above is as follows.
$\overline{r_j}(t)$: average data rate of Station-j
$r_j(t)$: data rate of Station-I at time t
$CW_i$: minimum contention window size if service i
N: the number of stations accessed to Wi-Fi AP $$\frac{r_j(t)}{\overline{r_j}(t)}:$$

A station having best RSSI value is first selected, but a priority increases when an average data rate at which service is received is low.

The aforementioned algorithm has an advantage in that a collision possibility is low even if many stations access.

According to the aforementioned embodiment, several schemes are applied to reduce a time TXOPlimit required to send a packet through an uplink and transmit realtime video streaming and VOIP through a downlink by the saved time, thereby improving a throughput.

Figure 10:
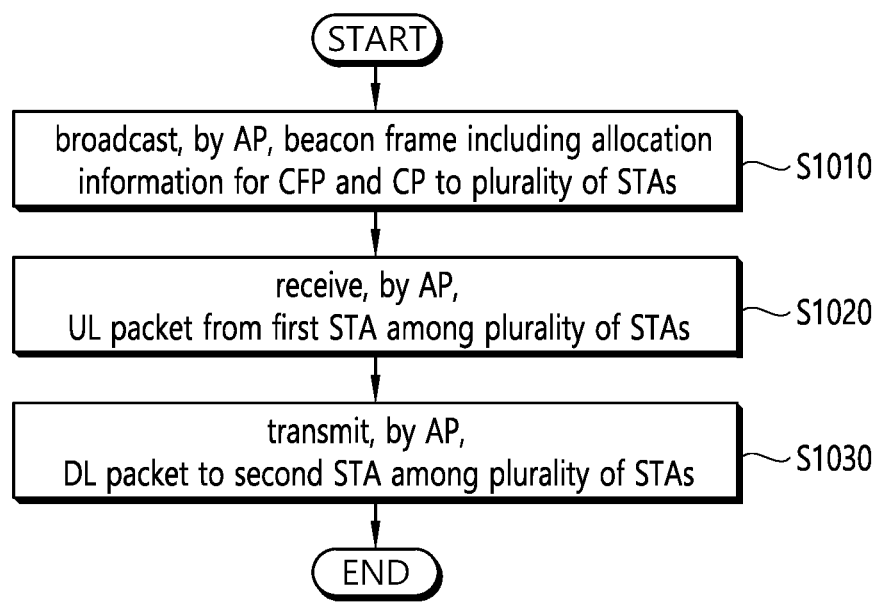
FIG. 10 is a flowchart showing a procedure of transmitting and receiving a packet according to the present embodiment.

FIG. 10 is a flowchart showing a procedure of transmitting and receiving a packet according to the present embodiment.

An example of FIG. 10 may be performed by an AP. The AP may correspond to a Wi-Fi SoftAP which is a wireless network device inside a telematics control unit (TCU) for a vehicle in a mobile edge clouding (MEC) network environment.

In step S1010, an access point (AP) broadcasts a beacon frame including allocation information for a contention free period (CFP) and a contention period (CP) to a plurality of stations (STAs).

In step S1020, the AP receives an uplink (UL) packet from a first STA among the plurality of STAs.

In step S1030, the AP transmits a downlink (DL) packet to a second STA among the plurality of STAs.

A length of the CFP is determined based on the number of the first STAs and an access category of traffic for the first STA.

The UL packet is received as many as the maximum number that can be transmitted within the determined length of the CFP. The DL packet is transmitted as many as the maximum number that can be transmitted during the CP. That is, packet load balancing in the CFP and the CP may be achieved by adjusting the length of the CFP adaptively according to a QoS characteristic of traffic. Accordingly, a downlink throughput and uplink throughput of the AP may be improved. In particular, in the proposed embodiment, since the UL packet is transmitted during the CFP, the UL packet is prevented from being transmitted during the CP, thereby transmitting more DL packets during the CP. Accordingly, more realtime traffic streaming is possible with the DL packet, thereby improving an overall throughput.

The AP may transmit a contention free (CF) poll frame to the first STA in a unicast manner. The UL packet may be transmitted to each of the first STAs, based on the CF poll frame.

The CF poll frame may be transmitted based on a priority. The priority may be obtained based on the number of packets waiting in a queue and an access category. The access category may include AC_VI(Access Category_Video), AC_VO(Access Category_Voice), AC_BE(Access Category_Best Effort), and AC_BK(Access Category_Background).

The CF poll frame may include an identifier and MAC address of a third STA which supports multi user-multi input multi output (MU-MIMO) among the first STAs. The UL packet may be transmitted from the third STA after the CF poll frame is transmitted and a short interframe sub-space (SIFS) elapses.

The AP may determine a size of a first UL packet that can be transmitted within a transmission cycle of the beacon frame, based on the identifier of the third STA and a data rate of the UL packet.

The AP may determine a time for performing transmission through the MU-MIMO, based on the size of the first UL packet.

The AP may transmit a block Ack (BA) for the UL packet to the third STA.

The CF poll frame may be transmitted whenever transmission is achieved through the MU-MIMO. The BA may be transmitted after a UL packet for a last CF poll frame is received. The BA may include the MAC address of the third STA.

A length of the CFP may be a sum of a length of a first CFP in which the third STA supporting the MU-MIMO transmits a packet and a length of a second CFP in which a fourth STA supporting SU-MIMO transmits a packet. The first CFP length may be determined based on the number of the third STAs and an access category of traffic for the third STA. The second CFP length may be determined based on the number of the fourth STAs and an access category of traffic for the fourth STA.

The DL packet may be transmitted based on a backoff value randomly selected in a contention window during the CP. A size of the contention window may be determined based on the number of the second STAs and an access category of traffic for the second STA. A length of the CP may be a length obtained by excluding a transmission cycle of the beacon frame from the determined length of the CFP.

The DL packet may include a packet used in realtime video streaming or voice over Internet protocol (VoIP).

The plurality of STAs may be subjected to an association procedure with the AP. Capabilities of the plurality of STAs may be identified based on the association procedure. The capability may correspond to whether the plurality of STAs support SU-MIMO or MU-MIMO or whether the plurality of STAs support 802.11ac, a, b, g, n, or the like.

The AP may receive high speed data from a base station through a telematics control unit (TCU). The high speed data may be transmitted and received through the UL packet or the DL packet, based on a quality of service (QoS) requirement of the plurality of STAs.

Figure 11:
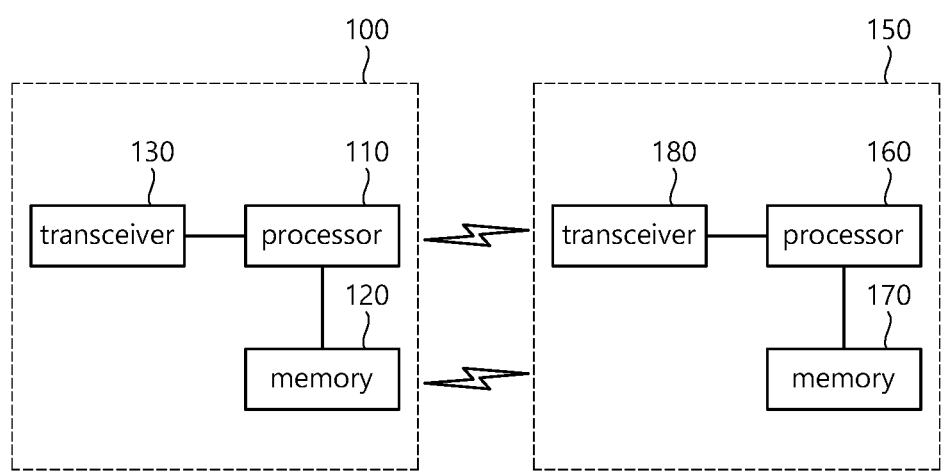
FIG. 11 is a diagram describing a device for implementing the above-described method.

FIG. 11 is a diagram describing a device for implementing the above-described method.

A wireless device (100) of FIG. 11 may correspond to an initiator STA, which transmits a signal that is described in the description presented above, and a wireless device (150) may correspond to a responder STA, which receives a signal that is described in the description presented above. At this point, each station may correspond to a 11_ay device (or user equipment (UE)) or a PCP/AP. Hereinafter, for simplicity in the description of the present disclosure, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

Figure 12:
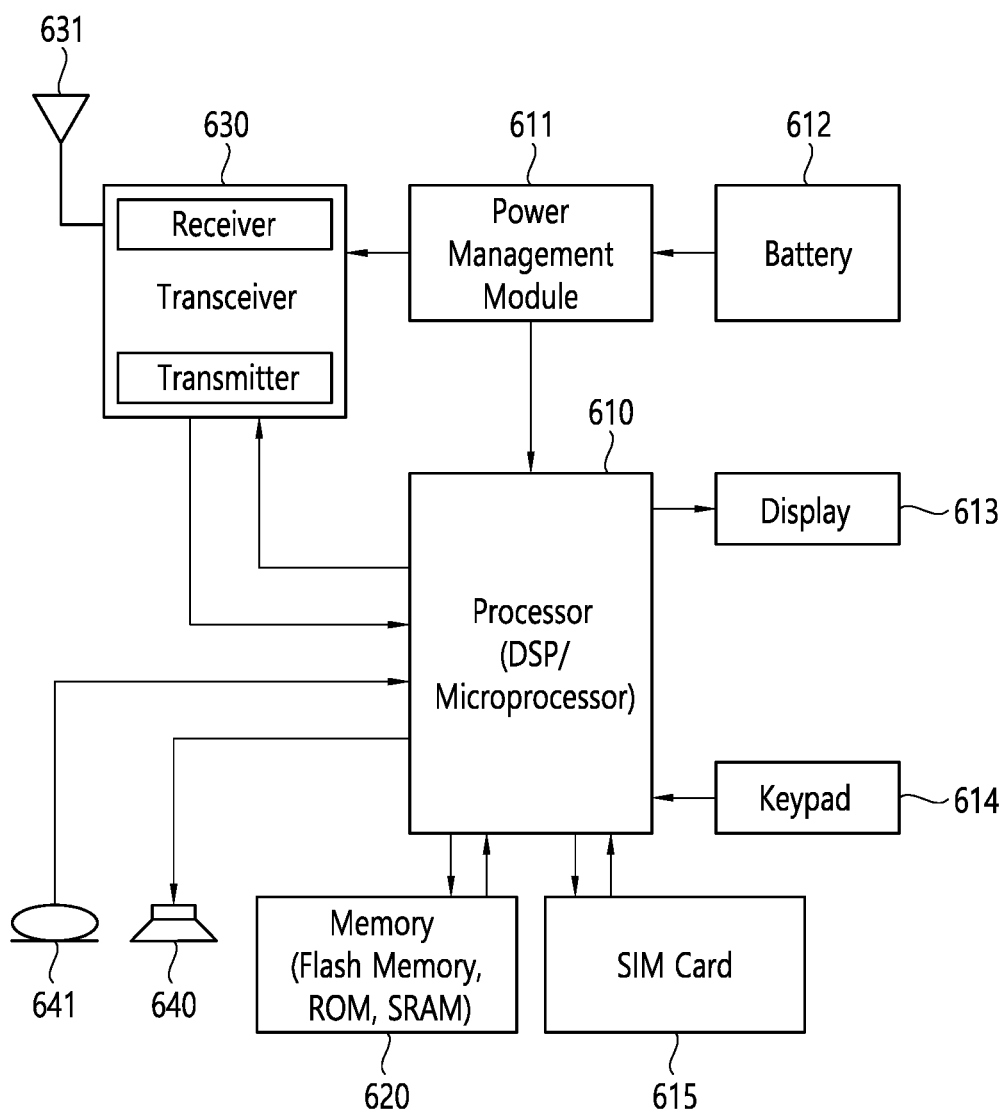
FIG. 12 shows a UE to which the technical features of the present disclosure can be applied.

FIG. 12 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In case of a transmitting device, the processor 610 broadcasts a beacon frame including allocation information for a contention free period (CFP) and a contention period (CP) to a plurality of stations (STAs), receives an uplink (UL) packet from a first STA among the plurality of STAs, and transmits a downlink (DL) packet to a second STA among the plurality of STAs.

What is claimed is:

1. A method of transmitting and receiving a packet in a wireless local area network (WLAN) system, the method comprising:
   broadcasting, by an access point (AP), a beacon frame including allocation information for a contention free period (CFP) and a contention period (CP) to a plurality of stations (STAs);
   receiving, by the AP, an uplink (UL) packet from a first STA among the plurality of STAs; and
   transmitting, by the AP, a downlink (DL) packet to a second STA among the plurality of STAs,
   wherein a length of the CFP is determined based on the number of the first STAs and an access category of traffic for the first STA,
   wherein the UL packet is received as many as the maximum number that can be transmitted within the determined length of the CFP, and
   wherein the DL packet is transmitted as many as the maximum number that can be transmitted during the CP.

2. The method of claim 1, further comprising
transmitting, by the AP, a contention free (CF) poll frame to the first STA in a unicast manner,
wherein the UL packet is transmitted to each of the first STAs, based on the CF poll frame.

3. The method of claim 2,
wherein the CF poll frame is transmitted based on a priority,
wherein the priority is obtained based on the number of packets waiting in a queue and an access category, and
wherein the access category includes AC_VI(Access Category_Video), AC_VO(Access Category_Voice), AC_BE(Access Category_Best Effort), and AC_BK (Access Category_Background).

4. The method of claim 2,
wherein the CF poll frame includes an identifier and MAC address of a third STA which supports multi user-multi input multi output (MU-MIMO) among the first STAs, and
wherein the UL packet is transmitted from the third STA after the CF poll frame is transmitted and a short interframe sub-space (SIFS) elapses.

5. The method of claim 4, further comprising:
determining, by the AP, a size of a first UL packet that can be transmitted within a transmission cycle of the beacon frame, based on the identifier of the third STA and a data rate of the UL packet;
determining, by the AP, a time for performing transmission through the MU-MIMO, based on the size of the first UL packet; and
transmitting, by the AP, a block Ack (BA) for the UL packet to the third STA,
wherein the CF poll frame is transmitted whenever transmission is achieved through the MU-MIMO,
wherein the BA is transmitted after a UL packet for a last CF poll frame is received, and
wherein the BA includes the MAC address of the third STA.

6. The method of claim 4,
wherein a length of the CFP is a sum of a length of a first CFP in which the third STA supporting the MU-MIMO transmits a packet and a length of a second CFP in which a fourth STA supporting SU-MIMO transmits a packet,
wherein the first CFP length is determined based on the number of the third STAs and an access category of traffic for the third STA, and
wherein the second CFP length is determined based on the number of the fourth STAs and an access category of traffic for the fourth STA.

7. The method of claim 1,
wherein the DL packet is transmitted based on a backoff value randomly selected in a contention window during the CP, wherein a size of the contention window is determined based on the number of the second STAs and an access category of traffic for the second STA, and wherein a length of the CP is a length obtained by excluding a transmission cycle of the beacon frame from the determined length of the CFP.

8. The method of claim 1, wherein the DL packet includes a packet used in realtime video streaming or voice over Internet protocol (VoIP).

9. The method of claim 1,
wherein the plurality of STAs are subjected to an association procedure with the AP, and
wherein capabilities of the plurality of STAs are identified based on the association procedure.

10. The method of claim 1, further comprising
receiving, by the AP, high speed data from a base station through a telematics control unit (TCU),
wherein the high speed data is transmitted and received through the UL packet or the DL packet, based on a quality of service (QoS) requirement of the plurality of STAs.

11. A wireless device as an access point (AP) for transmitting and receiving a packet in a wireless local area network (WLAN) system, the wireless device comprising:
a memory;
a transceiver; and
a processor operatively coupled with the memory and the transceiver, wherein the processor is configured to:
broadcast a beacon frame including allocation information for a contention free period (CFP) and a contention period (CP) to a plurality of stations (STAs);
receive, by the AP, an uplink (UL) packet from a first STA among the plurality of STAs; and
transmit, by the AP, a downlink (DL) packet to a second STA among the plurality of STAs,
wherein a length of the CFP is determined based on the number of the first STAs and an access category of traffic for the first STA,
wherein the UL packet is received as many as the maximum number that can be transmitted within the determined length of the CFP, and
wherein the DL packet is transmitted as many as the maximum number that can be transmitted during the CP.

12. The wireless device of claim 11,
wherein the processor is configured to transmit a contention free (CF) poll frame to the first STA in a unicast manner, and
wherein the UL packet is transmitted to each of the first STAs, based on the CF poll frame.

13. The wireless device of claim 12,
wherein the CF poll frame is transmitted based on a priority,
wherein the priority is obtained based on the number of packets waiting in a queue and an access category, and
wherein the access category includes AC_VI(Access Category_Video), AC_VO(Access Category_Voice), AC_BE(Access Category_Best Effort), and AC_BK (Access Category_Background).

14. The wireless device of claim 12,
wherein the CF poll frame includes an identifier and MAC address of a third STA which supports multi user-multi input multi output (MU-MIMO) among the first STAs, and
wherein the UL packet is transmitted from the third STA after the CF poll frame is transmitted and a short interframe sub-space (SIFS) elapses.

15. The wireless device of claim 14,
wherein the processor is configured to:
determine a size of a first UL packet that can be transmitted within a transmission cycle of the beacon frame, based on the identifier of the third STA and a data rate of the UL packet;
determine a time for performing transmission through the MU-MIMO, based on the size of the first UL packet; and
transmit a block Ack (BA) for the UL packet to the third STA, wherein the CF poll frame is transmitted whenever transmission is achieved through the MU-MIMO,
wherein the BA is transmitted after a UL packet for a last CF poll frame is received, and
wherein the BA includes the MAC address of the third STA.

16. The wireless device of claim 14,
wherein a length of the CFP is a sum of a length of a first CFP in which the third STA supporting the MU-MIMO transmits a packet and a length of a second CFP in which a fourth STA supporting SU-MIMO transmits a packet,
wherein the first CFP length is determined based on the number of the third STAs and an access category of traffic for the third STA, and
wherein the second CFP length is determined based on the number of the fourth STAs and an access category of traffic for the fourth STA.

17. The wireless device of claim 11,
wherein the DL packet is transmitted based on a backoff value randomly selected in a contention window during the CP,
wherein a size of the contention window is determined based on the number of the second STAs and an access category of traffic for the second STA, and
wherein a length of the CP is a length obtained by excluding a transmission cycle of the beacon frame from the determined length of the CFP.

18. The wireless device of claim 11, wherein the DL packet includes a packet used in realtime video streaming or voice over Internet protocol (VoIP).

19. The wireless device of claim 11,
wherein the plurality of STAs are subjected to an association procedure with the AP, and
wherein capabilities of the plurality of STAs are identified based on the association procedure.

20. The wireless device of claim 11,
wherein the processor is further configured to receive high speed data, by the AP, from a base station through a telematics control unit (TCU), and
wherein the high speed data is transmitted and received through the UL packet or the DL packet, based on a quality of service (QoS) requirement of the plurality of STAs.

* * * * *